United States Patent [19]

Kajiura

[11] Patent Number: 4,802,845

[45] Date of Patent: Feb. 7, 1989

[54] APPARATUS FOR DRIVING ROLLERS OF ROLLER HEARTH KILN

[75] Inventor: Yasuhiro Kajiura, Nagoya, Japan

[73] Assignee: NGK Insulators, Ltd., Japan

[21] Appl. No.: 91,410

[22] Filed: Aug. 31, 1987

[30] Foreign Application Priority Data

Sep. 17, 1986 [JP] Japan .............................. 61-142395[U]

[51] Int. Cl.$^4$ ................................................ F27B 9/24
[52] U.S. Cl. ..................................... 432/236; 432/246
[58] Field of Search ................ 432/233, 235, 236, 246

[56] References Cited

U.S. PATENT DOCUMENTS

| | | |
|---|---|---|
| 3,338,569 | 8/1967 | Cuvelier et al. |
| 3,608,876 | 9/1971 | Leaich et al. |
| 3,921,468 | 11/1975 | Wright. |
| 4,242,782 | 1/1981 | Hannekan et al. ................ 432/236 |
| 4,343,395 | 8/1982 | Lippert et al. .................... 432/246 |

FOREIGN PATENT DOCUMENTS 3417099 5/1985 Fed. Rep. of Germany.
1154614 6/1969 United Kingdom.

Primary Examiner—Henry C. Yuen
Attorney, Agent, or Firm—Parkhurst, Oliff & Berridge

[57] ABSTRACT

The rollers of a roller hearth kiln are coupled to corresponding driving shafts respectively, and each of the driving shafts has one thereof horizontally extended away from the kiln. A case which is disposed along the kiln houses the extended ends of the driving shaft, and vertical sprocket wheels are mounted on the extended ends of the driving shafts in the above case respectively. A rail is secured to the bottom of the case so as to extend below the sprocket wheels, and a driving chain moves on the rail while engaging the sprocket wheels from below.

2 Claims, 2 Drawing Sheets

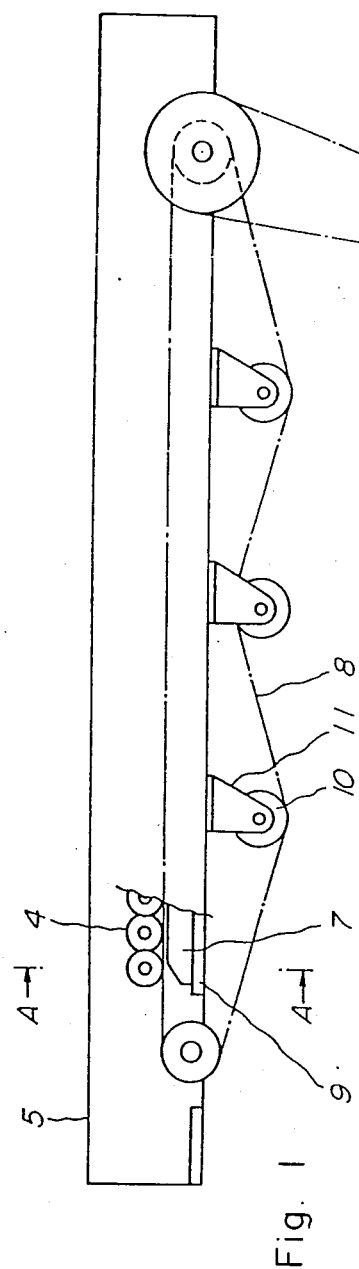
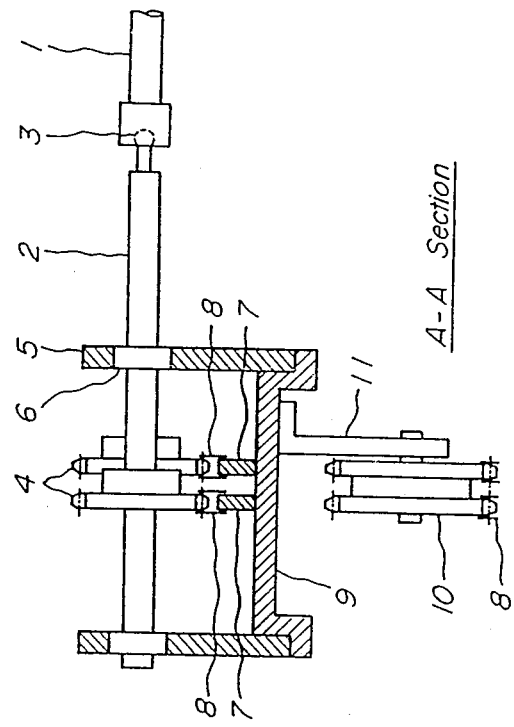

APPARATUS FOR DRIVING ROLLERS OF ROLLER HEARTH KILN

BACKGROUND OF THE INVENTION

1. Field of the Invention

This invention relates to an apparatus for driving the rollers of a roller hearth kiln which is used for making ceramic products such as for baking tile green ware.

2. Related Art Statement

In a conventional method for driving the rollers of a roller hearth kiln, a sprocket wheel is secured to the free end of each driving shaft of the roller and a long driving chain runs while engaging the sprocket wheels from above. In this method, the pitch of the driving chain must coincide with that of the sprockets. Even when they are in coincidence in the beginning, the driving chain is susceptible to an elongation after a long period of operation, and such elongation results in an increase of the driving chain pitch which leads to a difference in pitch between the driving chain and the sprockets. Difficulties have been experienced in that the driving chain tends to become afloat due to the above difference in pitch between the sprockets and the driving chain, and such floating of the driving chain is detrimental to accurate drive of the rollers.

Japanese Utility Model laid open Publication No. 9233/1972 proposed a modification of the roller driving apparatus. According to this modification, a continuous long case is provided on one side of the roller hearth kiln so as to house the sprocket wheels secured to the driving shafts of the rollers. Cushion rubber pieces are mounted on the lower surface of a top lid of the case in such a manner that each rubber piece urges the driving chain against the corresponding sprocket wheel so as to prevent the driving chain from getting afloat. However, the above modification has a number of shortcomings; namely, an additional load to the driving chain, difficulty in giving a proper tension to the driving chain, possibility of irregularity in roller rotation due to wear of the cushion rubber piece, and an increased complication in maintenance and repair such as removal of the top lid of the case which removal requires at least a partial stop of the roller hearth kiln.

SUMMARY OF THE INVENTION

Therefore, an object of the invention is to obviate the above-mentioned difficulty and shortcomings of the prior art by providing an improved apparatus for driving the rollers of a roller hearth kiln. The apparatus according to the invention ensures reliable transmission of driving power to the sprocket wheel of each roller, requires no additional torque as compared with the prior art, facilitates easy application of proper tension to the driving chain, and is easy to maintain and repair. Besides, the apparatus of the invention can be produced at a low cost.

An apparatus for driving rollers of a roller hearth kiln according to the invention uses a case disposed along the kiln so as to house sprocket wheels secured to driving shafts of the rollers. A rail is disposed, directly or indirectly, on bottom of the case so that the rail extends below the sprocket wheels of the driving shafts. A driving chain runs on the rail while engaging the sprocket wheels from below.

Since the driving chain runs on the rail, it never gets afloat or moves away from the sprocket wheels, so that smooth transmission of the driving power to the sprocket wheels is always ensured.

Preferably, tensile sprocket wheels can be provided below the case, so that the driving chain engages such tensile sprocket wheels at a position below the case. With the tensile sprocket wheels, a proper tension can be easily applied to the driving chain, and proper engagement of the driving chain with the sprocket wheels of the driving shafts can be ensured. Thus, the use of the conventional cushion rubber pieces is completely eliminated together with shortcomings associated therewith.

BRIEF DESCRIPTION OF THE DRAWINGS

For a better understanding of the invention, reference is made to the accompanying drawings, in which FIG. 1 is a solid sectional view of an apparatus according to the invention;

FIG. 2 is a sectional view taken along the A—A line in FIG. 1;

Figure 3:
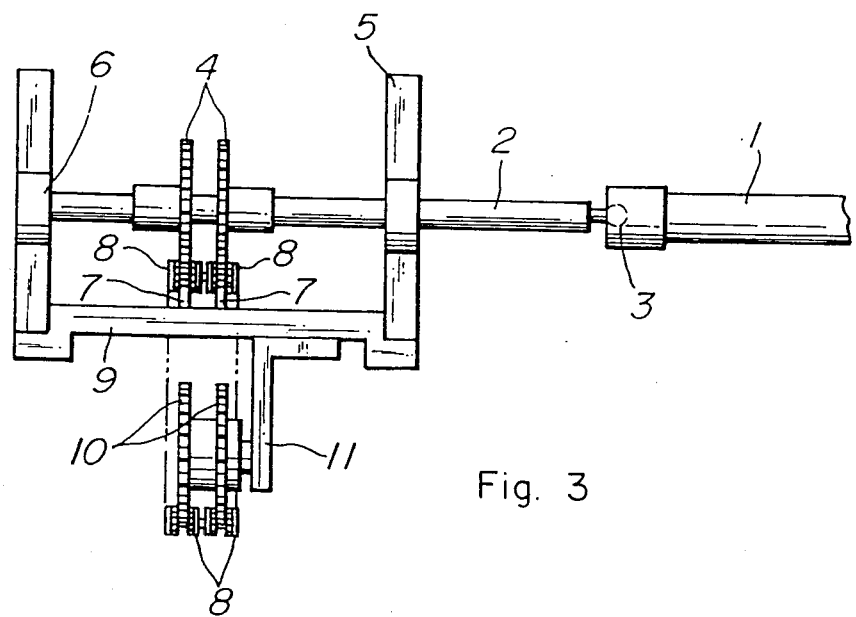
FIG. 3 is a schematic sectional view of an apparatus according to the invention, which view is taken at right angles to longitudinal direction of a roller hearth kiln.

In the Figures, 1 is a roller, 2 is a driving shaft, 3 is a coupler, 4 is a sprocket wheel, 5 is a case, 6 is a bearing, 7 is a rail, 8 is a driving chain, 9 is a bottom plate, 10 is a tensile sprocket wheel, and 11 is a holder.

DESCRIPTION OF THE PREFERRED EMBODIMENT

As seen in FIG. 2, each roller 1 is driven by a corresponding driving shaft 2 which is coupled to the roller 1 by a coupler 3. It is understood that a plurality of parallel rollers 1 are disposed in a roller hearth kiln at a certain pitch, but only one of such rollers 1 is shown in the figure for simplicity. The axis of rotation of each roller 1 is at right angles to the longitudinal direction of the kiln.

The driving shaft 2 of the embodiment carries a pair of sprocket wheels 4, 4 with a spacing therebetween. A case 5 extends along one side of the kiln so as to house sprocket wheels 4 carried by the driving shafts 2. The case 5 extends in the longitudinal direction of the kiln, so that the driving shaft 2 is journaled by bearings 6, 6 mounted on opposite sidewalls of the case 5.

A pair of rails 7, 7 are disposed on the inner surface of the bottom plate 9 of the case 5 in such a manner that the two rails 7, 7 extend below the corresponding sprocket wheels 4, 4 of each driving shaft 2 respectively. A driving chain 8 runs on the top surface of each rail 7 while engaging the sprocket wheel 4 from below as shown in FIG. 1. After reaching the longitudinal end of the case 5, each driving chain 8 descends to the outside of the case 5 and returns to the opposite longitudinal end of the case 5 through a path under the bottom plate 9 so as to form an endless loop of the driving chain 8.

At least one tensile sprocket wheel 10 is rotatably supported by an adjustable holder 11, which holder 11 is secured to the bottom plate 9 of the case 5 and is capable of holding the tensile sprocket wheel 10 on the return path of the driving chain 8 (FIG. 1). Thus, the driving chain 8 engages the tensile sprocket wheel 10 on its return path under the bottom plate 9, and a suitable tension is given to the driving chain 8 from the tensile sprocket wheels 10 are used, they may be arranged in such a manner that the driving chain 8 may extend along a zigzag path while engaging such tensile sprocket wheels 10.

In operation, when the driving chain 8 runs, all the rollers 1 engaging the driving chain 8 are rotated at an identical revolving speed on the same direction by the transmission through the sprocket wheels 4, in the same manner as in the case of prior art. The apparatus of the invention does not require precision in the coincidence of the pitch of the sprockets of the sprocket wheel 4 with the pitch of the driving chain 8 because the distance between the driving chain 8 and the rollers 1 is always kept constant, while such coincidence has been necessary with the prior art. The apparatus of the invention also eliminates the risk of floating of the driving chain 8 away from the sprocket wheel 4 even if the driving chain 8 is somewhat elongated after use, because the driving chain 8 runs on the rail 7. Thus, the invention ensures reliable power transmission from the driving chain 8 to the rollers 1.

Further, the location of the return path of the driving chain 8 under the case 5 facilitates the application of a proper tension to the driving chain 8 and easy maintenance of the driving chain 8. As compared with the conventional structure of urging the driving chain 8 against the sprocket wheels 4 by the cushion rubber pieces secured to the inside surface of a top lid of the case 5, the apparatus of the invention is free not only from the extra load of urging the driving chain 8 but also from any troubles due to wearing of the cushion rubber pieces, so that its maintenance is very easy and its production cost can be reduced.

In the illustrated embodiment, the rail 7 is disposed directly on the bottom plate 9 of the case 5, but it is also possible to secure a suitable mounting member for the rail 7 on the inside surface of the case 5 so as to provide a spacing between the inside surface of the case 5 and the rail 7.

As described in detail in the foregoing, the apparatus of the invention ensures reliable power transmission from a driving chain to sprocket wheels secured to the driving shafts for rollers, requires no extra torque for urging the driving chain toward the sprocket wheels, facilitates easy application of a proper tension to the driving chain and easy maintenance, and reduces the production cost. Thus, the invention obviates the difficulties and shortcomings of the prior art and contributes greatly to the industry.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. An apparatus for driving rollers of a roller hearth kiln, comprising:
    a plurality of driving shafts coupled to corresponding rollers of a roller hearth kiln respectively,
    a case extending along the kiln so as to house those ends of the driving shaft therein which ends are away from the kiln,
    sprocket wheels secured to said ends of the driving shafts in said case respectively,
    a rail disposed on the bottom of the case so as to extend below said sprocket wheels,
    a driving chain in a form of a loop including a return path located outside said case and moving on the rail while engaging said sprocket wheels from below,
    a tensile sprocket wheel rotatably supporting by a holder and secured to said end of each driving shaft in the bottom of said case, and
    an additional rail disposed on the bottom of the case so as to extend below said tensile sprocket wheel,
    said driving chain moving on the additional rail while engaging said tensile sprocket wheel from below for applying a tension to the driving chain.

2. An apparatus for driving rollers as set forth in claim 1, further comprising an additional driving chain moving on the additional rail while engaging said tensile sprocket wheel from below.

* * * * *